(12) United States Patent
Sakai et al.

(10) Patent No.: US 6,697,162 B1
(45) Date of Patent: Feb. 24, 2004

(54) OPTICAL INTERFEROMETRIC MEASURING INSTRUMENT AND LASER INTERFERENCE APPARATUS

(75) Inventors: Hisayoshi Sakai, Tsukuba (JP); Tetsuhiko Kubo, Utsunomiya (JP); Yoshio Saruki, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 232 days.

(21) Appl. No.: 09/686,946

(22) Filed: Oct. 12, 2000

(30) Foreign Application Priority Data

Oct. 13, 1999 (JP) .......................................... 11-291595

(51) Int. Cl.[7] ................................................ G01B 9/02
(52) U.S. Cl. ...................................................... 356/500
(58) Field of Search ................................ 356/500, 496, 356/497, 498, 505, 477, 482

(56) References Cited

U.S. PATENT DOCUMENTS 5,552,888 A * 9/1996 Sogard et al. ............... 250/548
6,421,130 B1 * 7/2002 Phillion ....................... 356/450

FOREIGN PATENT DOCUMENTS

| JP | 8-166215 | 6/1996 |
| JP | 11-132710 | 5/1999 |

* cited by examiner

Primary Examiner—Samuel A. Turner
Assistant Examiner—Michael A. Lyons
(74) Attorney, Agent, or Firm—Oliff & Berridge, PLC

(57) ABSTRACT

An optical interferometric measuring instrument comprises a laser light source 12, an interferometer portion 14, a reflecting mirror 20, a bellows driving carriage 30, and a fixed portion 34. The bellows driving carriage 30 moves together with a slider 16. A main bellows 36 is disposed between the bellows driving carriage 30 and the fixed portion 34. An auxiliary bellows 38 is disposed between the reflecting mirror 20 and the bellows driving carriage 30. An auxiliary bellows 40 is disposed between the interferometer portion 14 and the fixed portion 34. It is possible to avoid the variation of the laser wavelength ascribable to the change of the refractive index of air when the laser light passes through the air.

13 Claims, 9 Drawing Sheets

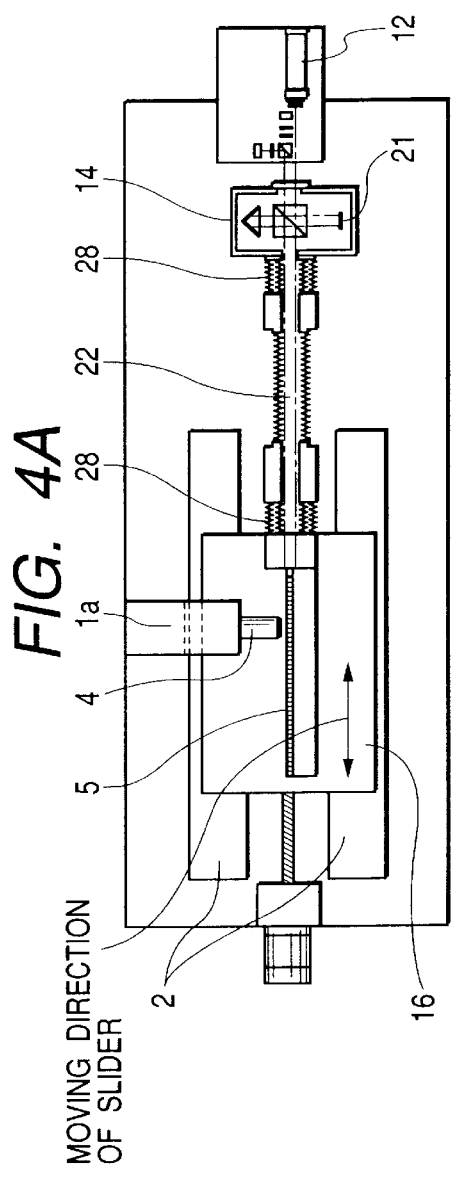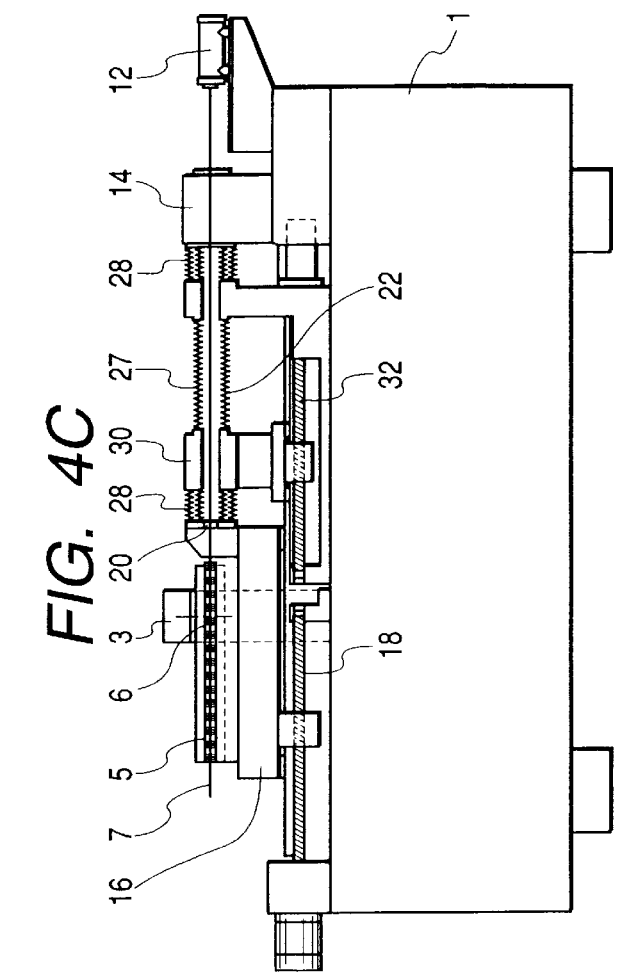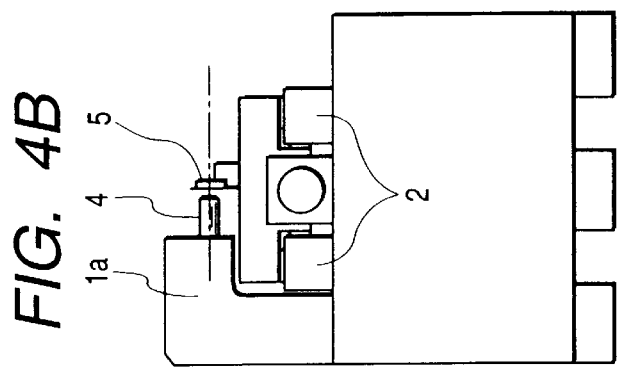

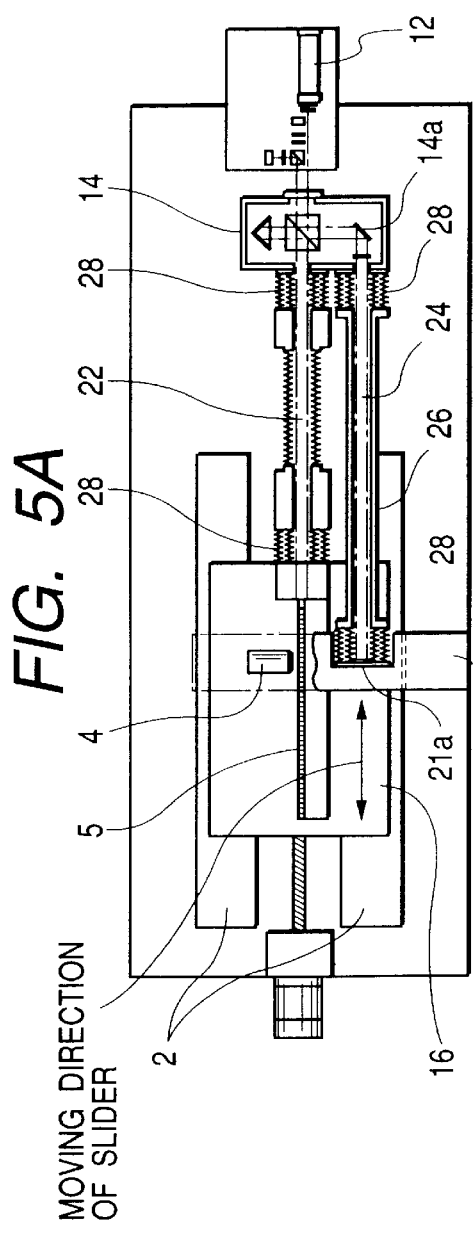
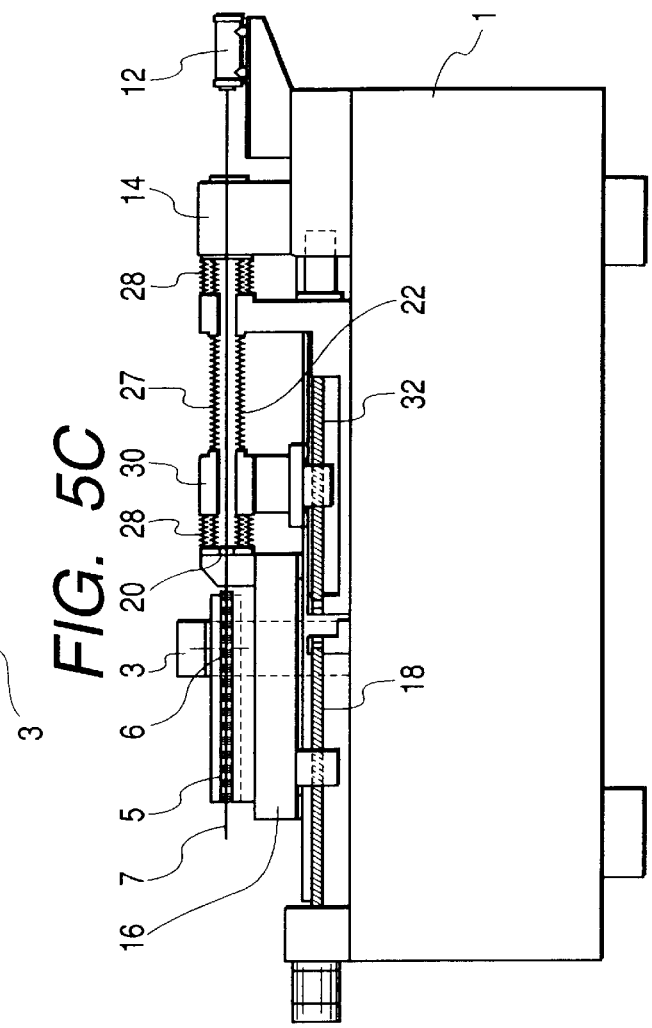
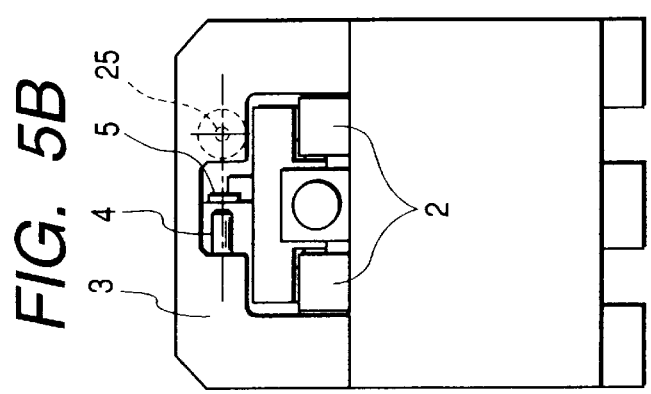
FIG. 5A
FIG. 5B
FIG. 5C

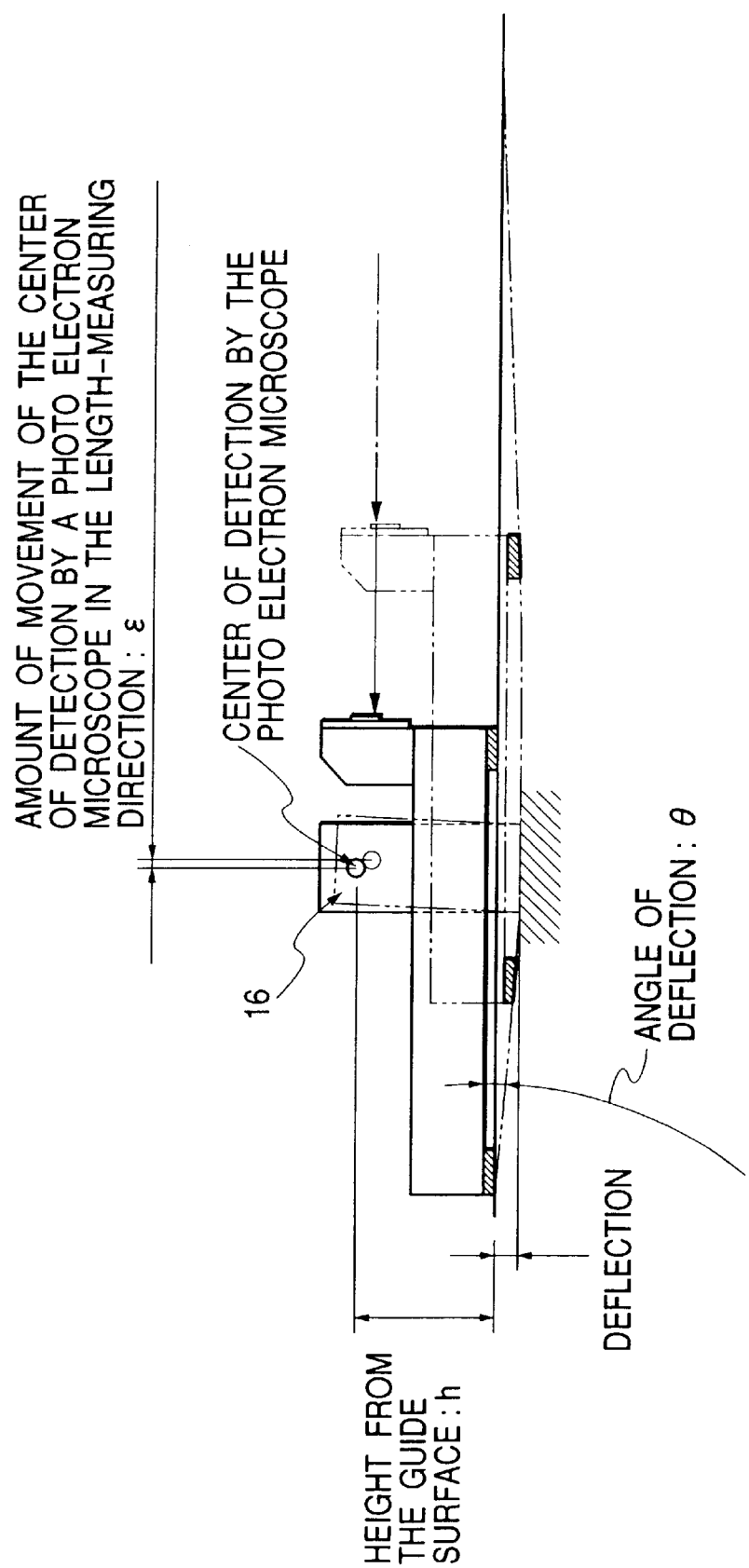

FIG. 9A
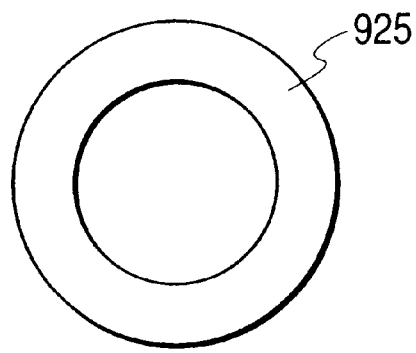
FIG. 9B
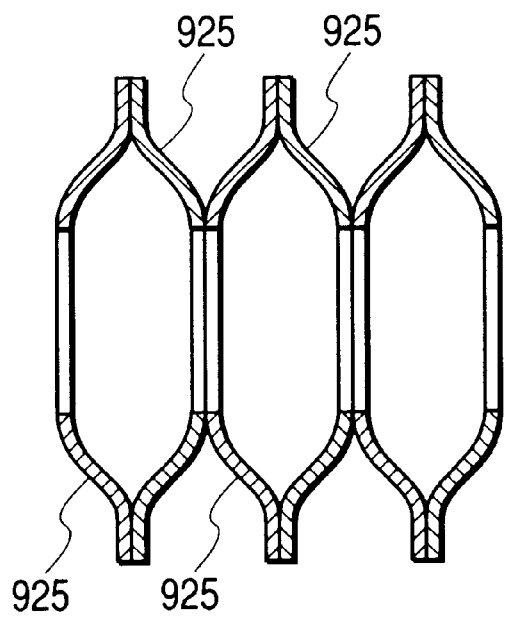

OPTICAL INTERFEROMETRIC MEASURING INSTRUMENT AND LASER INTERFERENCE APPARATUS

BACKGROUND OF THE INVENTION

1. Field of the Invention

The present invention relates to an optical interferometric measuring instrument, and more particularly to the ultra precision laser interferometric measuring instrument using laser light. Further, the present invention relates to a laser interference apparatus, and more particularly to the laser interference apparatus which processes an object disposed on a slider potion whose amount of movement is measured by a laser interferometric measuring instrument.

2. Related Art

In recent years, concerning the measurement of length, particular importance has come to be attached to the traceability of the length, and the presentation of the uncertainty of measurement accuracy has come to be required. In the present situation in which the laser wavelength serves as a standard of the length, a laser interferometric measuring system is widely used as a length measuring means in measuring instruments and apparatus, an ultra precision machining apparatus, and the like so as to facilitate the traceability of the standard of the length and simplify factors for the uncertainty of the measurement accuracy.

In the case where the laser interferometric measuring system is used as the means for measuring with high accuracy the displacement of a slider in the measuring instruments and apparatus, an ultra precision machining apparatus, and the like, variations of the laser wavelength ascribable to the change of the refractive index due to changes in the air temperature or pressure, humidity, and $CO_2$ concentration in the atmosphere hamper the high-precision length measurement, so that it has been proposed to evacuate the optical path of the laser.

FIG. 7 shows the configuration of a conventional optical interferometric measuring instrument. This optical interferometric measuring instrument is comprised of a body base 710, a laser light source 712, an interferometer portion 714, a slider 716, a slider driving mechanism 718, a reflecting mirror 720, and a bellows 722.

The laser light source 712 is fixed on the body base 710, and is adapted to emit laser light for length measurement toward the reflecting mirror 720.

The interferometer portion 714 has a half mirror and the like, and is adapted to measure the distance to the reflecting mirror 720, i.e., the distance to an end portion of the slider 716, by detecting the phase difference between the direct light emitted from the laser light source 712 and the reflected light returned after being reflected by the reflecting mirror 720 after passing through the bellows 722.

The slider 716 is disposed on the body base 710, and is provided movably in the directions of arrows in the drawing by the slider driving mechanism 718. In a case where the length of an object to be measured is measured, the slider 716 is moved so as to allow an end portion of the slider 716 to abut against the object to be measured.

The reflecting mirror 720 is disposed at the end portion of the slider 716, and moves in the directions of arrows in the drawing in conjunction with the movement of the slider 716. Then, reflecting mirror 720 reflects the light emitted from the laser light source 712, and returns the laser light to the interferometer portion 714.

The bellows 722 functions as a light guiding portion for guiding the laser light from the laser light source 712 to the reflecting mirror 720, and one end thereof is connected to the interferometer portion 714, while the other end thereof is connected to the reflecting mirror 720. The bellows 722 is stretchable in the moving direction of the slider 716, and if the slider 716 is moved to measure the length of the object to be measured, the bellows 722 is also extended or contracted in conjunction with the movement of the slider 716. The interior of the bellows is exhausted of the air by a vacuum pump until it is set substantially in a vacuum state. Since the laser light from the laser light source 712 passes through the vacuum in the bellows 722, the length-measuring optical path is constantly kept in a vacuum state. Accordingly, the variation of the laser wavelength ascribable to a change in the refractive index due to changes in the air temperature, atmospheric pressure, humidity, and the $CO_2$ concentration does not occur, so that high-accuracy measurement becomes possible.

However, there has been a problem in that the couple of forces consisting of the product of, on the one hand, an offset distance of an axis of a force combining a suction force of the bellows 722 attributable to the difference between the internal pressure (a vacuum state) of the vacuum bellows 722 and the atmospheric pressure and a spring force consisting of the product of a spring constant peculiar to the bellows 722 and its amount of extension and contraction and, on the other hand, an offset distance of a driving axis for moving the slider causes a change in the geometric attitude of the slider 716 and a change in its velocity during driving (these cause a positional change of the reflecting mirror 720) as well as a strain in the interferometer portion 714, thereby rendering the high-accuracy length measurement difficult.

FIG. 8 shows another configuration of the conventional optical interferometric measuring instrument. The difference with the optical interferometric measuring instrument shown in FIG. 7 lies in that, instead of the bellows 722, a bellows 824 having a double structure which is composed of an inner shell 824a and an outer shell 824b is provided as the light guiding portion. The inner side of the bellow 824 of the double structure (or an inside of the inner shell 824a) is exhausted of the air into a vacuum state by the vacuum pump in the same way as in FIG. 7, and the outer side (a space between the inner shell 824a and the outer shell 824b) is set to an appropriate pressure higher than the atmospheric pressure. Since the inner side of the bellows 824 is in a vacuum state, a suction force due to the difference with the atmospheric pressure occurs, but since the outer side of the bellows 824 is set to the pressure higher than the atmospheric pressure, an expanding force (force acting in an expanding direction) is conversely applied due to the difference with the atmospheric pressure. Accordingly, by using such a bellows 824 of the double structure, the suction force on the inner side which is in the vacuum state can be offset by the force consisting of the product of the appropriate pressure set on the outer side and the pressure receiving area in the extending and contracting direction.

It should be noted that the arrangements of the bellows 822 and 824 which are used in FIGS. 7 and 8 are as shown in FIGS. 9A–B, for example. The bellows 722 and 824 are each formed by superposing a plurality of doughnut-shaped weldable metallic plates 925 (e.g., made of austenitic stainless steel) shown in FIG. 9A and by welding them. FIG. 9B shows a vertical cross section of the bellows 722 and 824, and by bending and mutually welding the doughnut-shaped weldable metallic plates 925 shown in FIG. 9A, it is possible to obtain a member which has a hollow portion in its interior and which is stretchable in the directions of arrows. It goes without saying that a metal formed bellows is also used in addition to the welded bellows.

However, also in the case of the optical interferometric measuring instrument using the bellows 824 having the double structure shown in FIG. 8, the bellows 824 extends or contracts in conjunction with the movement of the slider 816, so that there has been a problem in that a change in the geometric attitude of the slider 816 and a change in its velocity during driving as well as a strain in the interferometer portion 814 still occur due to the force consisting of the product of the spring constant peculiar to the double-structure bellows 824 and the amount of its extension or contraction in the same case of FIG. 7, thereby rendering high-accuracy length measurement difficult.

It is, of course, conceivable to adopt a method in which the variation of the set pressures on the outer and inner sides due to the extension or contraction of the double-structure bellows as well as the force occurring in the extending or contracting direction of the bellows 824 due to the spring constant of the double-structure bellows 824 are detected by a sensor the like, so as to dynamically control the set pressures for the outer and inner sides. However, there occurs the problem that the a control system for the length measuring apparatus becomes complicated, and there is also a problem in that it is difficult to fabricate a double-structure bellows which is applicable over the entire length of the driving stroke of the slider 816, thereby leading to an increased cost.

Further, as a problem which is common to both the optical interferometric measuring instrumentes shown in FIGS. 7 and 8, there is a problem in that the longitudinal wave accompanied by the nonuniformity of the extension and contraction of the bellows occurring during the driving of the slider 716, 816 constitutes a disturbance in the attitude control or motion control of the slider 716, 816, thereby rendering high-accuracy length measurement difficult.

SUMMARY OF THE INVENTION

The invention has been devised in view of the above-described problems of the conventional art, and its first object is to provide an optical interferometric measuring instrument which is capable of reliably preventing a geometric change in the attitude of the slider and a change in its velocity during driving as well as a strain in the interferometer portion due to the force caused by the extension or contraction of the light guiding portion as a consequence of the movement of the slider, and which renders high-accuracy length measurement possible.

Further, its second object is to provide a laser interference apparatus which is capable of high-accuracy processing using a laser interferometric measuring instrument and which is capable of simply eliminating an error due to the thermal deformation of the body base caused by the variation of the ambient temperature and due to the deflection of the body base as a consequence of the movement of the slider.

To attain the above first object, in accordance with an optical interferometric measuring instrument of the invention, there is provided an optical interferometric measuring instrument including a laser light source, a light guiding portion whose interior is evacuated, a reflecting optical system disposed at one end of the light guiding portion and adapted to move with a slider, and a light interference system disposed at another end of the light guiding portion, a vacuum space between the light interference system and the reflecting optical system constituting an optical path for length measurement by laser light from the laser light source, characterized in that a moving portion and a light-guiding-portion fixing portion which move in interlocking relation to the slider are disposed in the length-measuring optical path, and the light guiding portion is disposed between the moving portion and the light-guiding-portion fixing portion, and includes a main light guiding portion disposed between the moving portion and the fixed portion and capable of freely extending and contracting in the moving direction of the slider, a first auxiliary light guiding portion disposed between the reflecting optical system and the moving portion and capable of freely extending and contracting in the moving direction of the slider, and a second auxiliary light guiding portion disposed between the fixed portion and the light interference system.

In the above-mentioned optical interferometric measuring instrument, it is preferable that the first auxiliary light guiding portion has a double structure, and is structured such that a vacuum interior thereof is covered with an outer shell having a predetermined pressure higher than the atmospheric pressure.

Further, in the optical interferometric measuring instrument, it is preferable that each of the first auxiliary light guiding portion and the second auxiliary light guiding portion has a double structure, and is structured such that a vacuum interior thereof is covered with an outer shell having a predetermined pressure higher than the atmospheric pressure.

In addition, in the above-mentioned optical interferometric measuring instrument, it is preferable that each of the main light guiding portion, the first auxiliary light guiding portion, and the second auxiliary light guiding portion has a double structure, and is structured such that a vacuum interior thereof is covered with an outer shell having a predetermined pressure higher than the atmospheric pressure.

To attain the above second object, in accordance with the invention there is provided a laser interference apparatus including a slider on which an object is fixed; a laser interferometer having a reference optical path and adapted to measure an amount of movement of a slider by using interference of laser light between the reference optical path and a variable-length optical path; and processing means fixed on a body base of the laser interferometer and adapted to process the object to be processed, wherein the object to be processed is processed by the processing means by using as a reference the amount of movement of the slider identified by the laser interferometer, characterized in that an optical axis of the laser interferometer and a point of processing the object to be processed by the processing means are disposed on a straight line, and that a fixed reflecting mirror for forming the reference optical path of the laser light is fixed on the body base so as to be located at an identical position to the point of processing in a direction of a moving axis of the slider, and both the variable-length optical path and the reference optical path extend in the moving direction of the slider on the body base.

In the above-mentioned laser interference apparatus, it is preferable that an interferometer portion, the reference optical path, and the variable-length optical path which make up the laser interference apparatus are in a vacuum state. Here, preferably, the reference optical path includes a pipe-like structure and a double-structure bellows, and is connected to the fixed reflecting mirror through the bellows.

Further, in the laser interference apparatus, it is preferable that the processing means and the fixed reflecting mirror are disposed on abridge structure straddling the slider, and the bridge structure is fixed to the body base.

In addition, in the laser interference apparatus, preferably, the object to be processed is a line standard having a scale fixed in parallel with a moving direction of the slider, and the processing means is a detector for detecting the scale at the point of processing.

BRIEF DESCRIPTION OF THE DRAWINGS

FIGS. 4A–C are respectively schematic diagrams of a line-standard evaluating machine of a fourth embodiment according to the present invention using the laser interferometric measuring instrument shown in FIG. 1; and FIGS. 5A–C are respectively schematic diagrams of a line-standard evaluating machine of a fifth embodiment according to the present invention using the laser interferometric measuring instrument shown in FIG. 1; and FIG. 6 is a diagram explaining the occurrence of the deflection of a body base due to the movement of the slider in FIGS. 4A–C.

FIGS. 9A–B are respectively schematic diagrams of a bellows.

DETAILED DESCRIPTION OF THE PREFERRED EMBODIMENTS

Referring now the drawings, a description will be given of the embodiments of the invention.
<First Embodiment>

Figure 1:
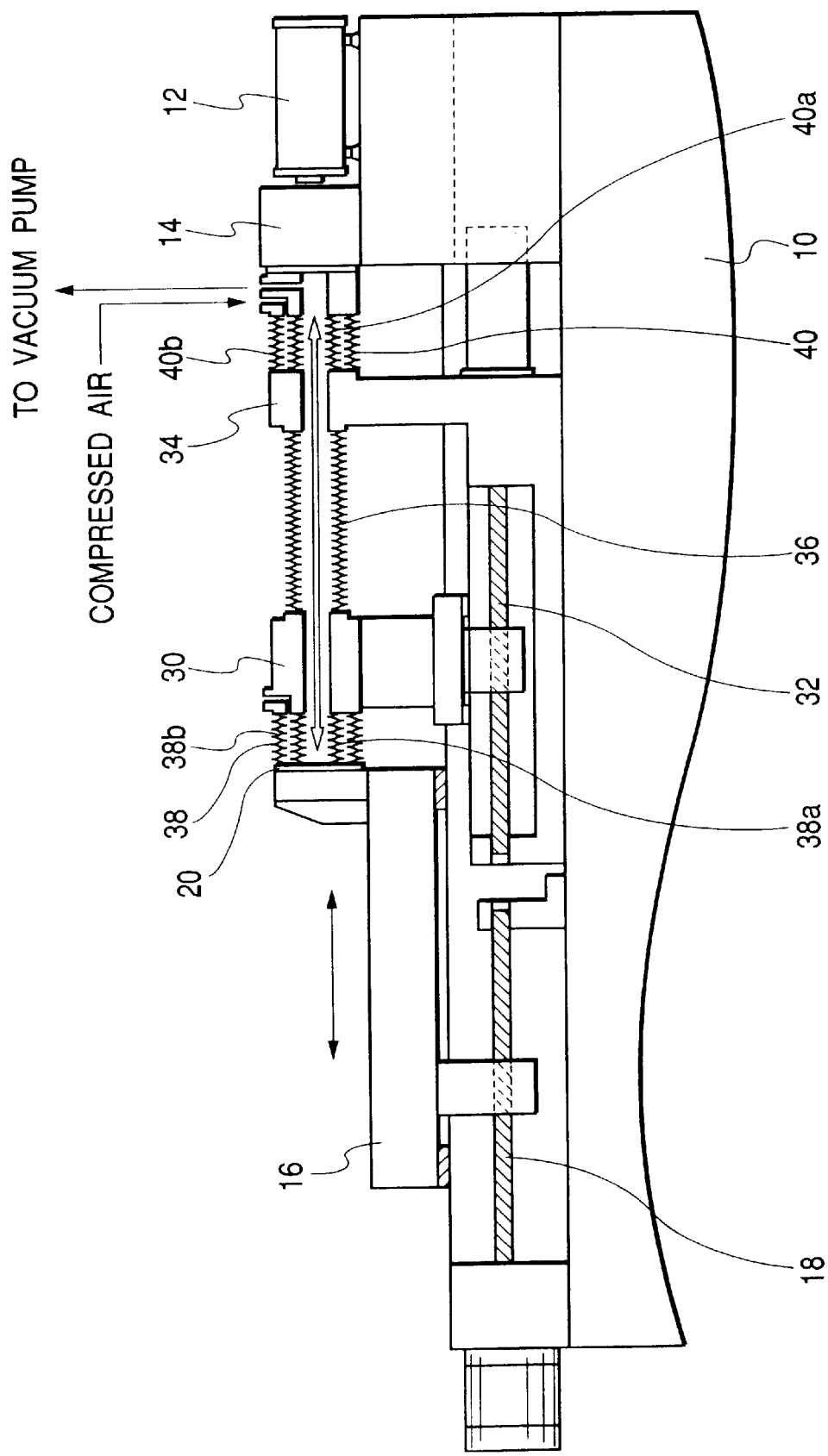
FIG. 1 is a schematic diagram of a laser interferometric measuring instrument of a first embodiment according to the present invention.

FIG. 1 shows the configuration of an optical interferometric measuring instrument in accordance with a first embodiment of the present invention. In the same way as the conventional optical interferometric measuring instrument shown in FIG. 7 or 8, this optical interferometric measuring instrument is comprised of a body base 10, a laser light source 12, an interferometer portion 14, a slider 16, a slider driving mechanism 18, and a reflecting mirror 20. It should be noted that the interferometer portion 14 functions as a light interference system, and the reflecting mirror 20 functions as a reflecting optical system.

In addition, in the optical interferometric measuring instrument in this embodiment, a bellows driving carriage 30 serving as a moving portion and a fixed portion 34 serving as a light-guiding-portion fixing portion are further provided. The bellows driving carriage 30 moves together with the slider 16 by means of a bellows driving mechanism 32 in interlocking relation to the slider 16. Namely, synchronous driving control is provided for the slider driving mechanism 18 and the bellows driving mechanism 32 to impart a similar driving command. Consequently, the slider 16 and the bellows driving carriage 30 undergo a substantially similar motion in accordance with the driving command. However, as for the slider 16 and the bellows driving carriage 30, driving conditions including the mass, the load resistance, the guiding system, and the like respectively differ, so that the relative difference between their movements is not strictly zero, and a relative positional change corresponding to the motion control capability occurs. This change is absorbed by the extension and contraction of an auxiliary bellows 38, as will be described later. Meanwhile, the fixed portion 34 is fixed to the body base 10, does not move even by the movement of the slider 16 and the bellows driving carriage 30, and maintains its position.

In addition, the light guiding portion of the optical interferometric measuring instrument in this embodiment has three portions. Namely, they include a main bellows 36 serving as a main light guiding portion disposed between the bellows driving carriage 30 and the fixed portion 34; the auxiliary bellows 38 serving as a first auxiliary light guiding portion disposed between the reflecting mirror 20 and the bellows driving carriage 30; and an auxiliary bellows 40 serving as a second auxiliary light guiding portion disposed between the interferometer portion 14 and the fixed portion 34.

Figure 7:
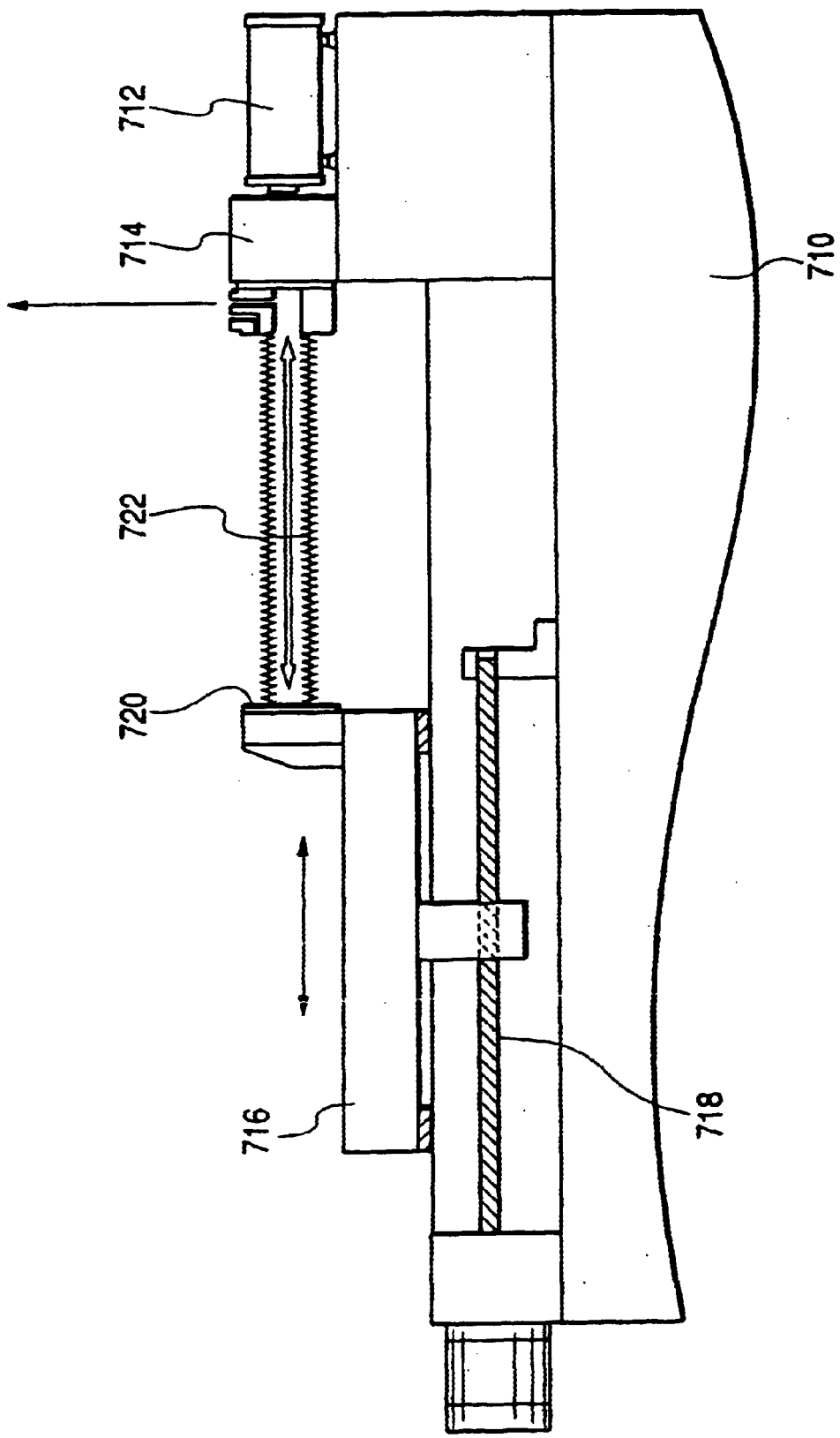
FIG. 7 is a schematic diagram of a laser interferometric measuring instrument according to a conventional art.

The main bellows 36 is a single-structure bellows in the same way as the bellows 722 shown in FIG. 7, and its interior is exhausted of the air into a vacuum state. Since one end of the main bellows 36 is connected to the fixed portion 34, and the other end thereof is connected to the bellows driving carriage 30, when the bellows driving carriage 30 moves in conjunction with the movement of the slider 16, the main bellows 36 also extends or contracts in the direction of arrows in the drawing.

Figure 8:
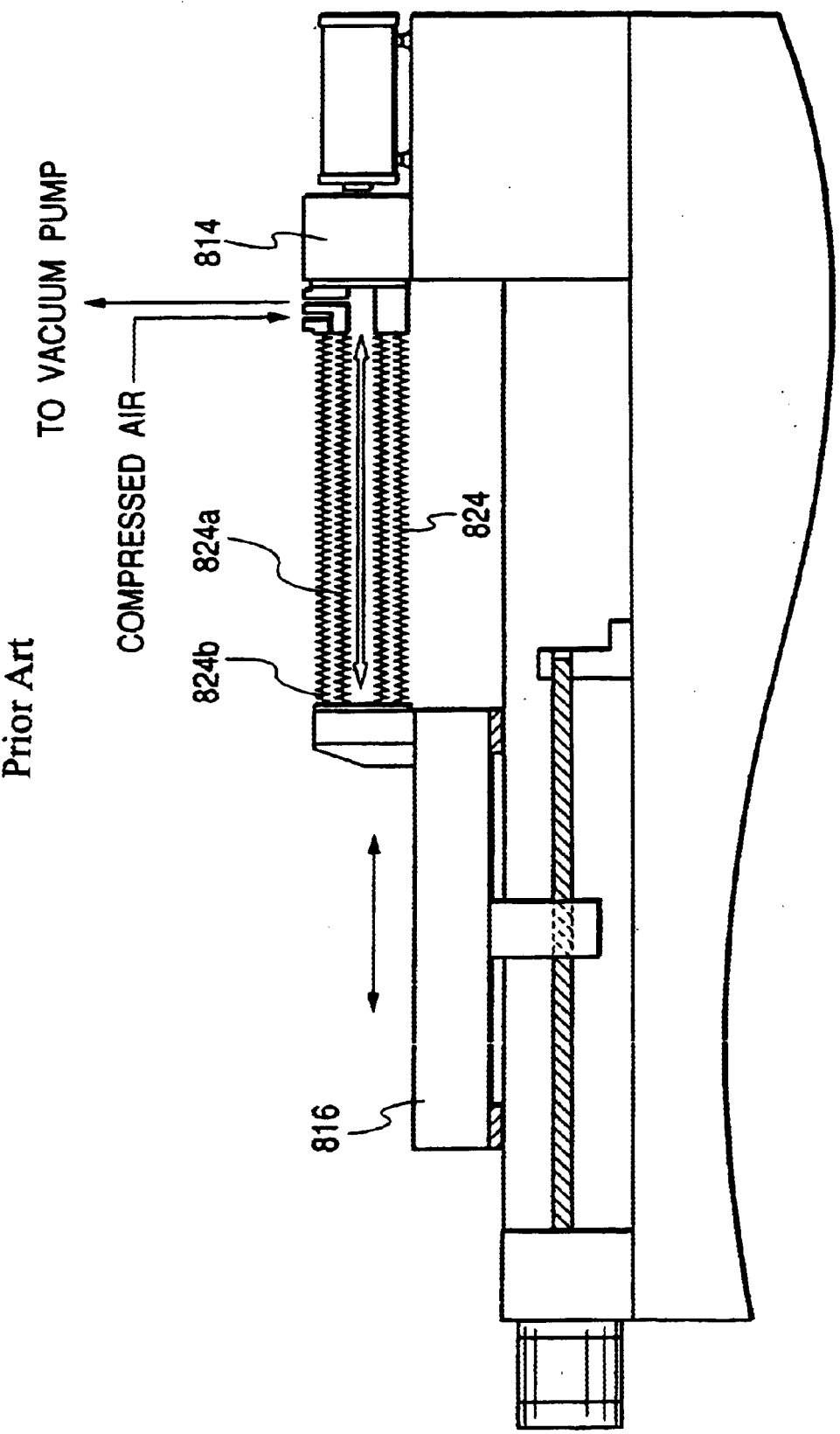
FIG. 8 is a schematic diagram of a laser interferometric measuring instrument according to another conventional art.

The auxiliary bellows 38 is a double-structure bellows which is composed of an inner shell 38a and an outer shell 38b in the same way as a bellows 824 shown in FIG. 8, and its inner side (or an inside of the inner shell 38a) is exhausted of the air into a vacuum state, while its outer side (or a space between the inner shell 38a and the outer shell 38b) is maintained at a predetermined pressure higher than the atmospheric pressure. One end of the auxiliary bellows 38 is connected to the reflecting mirror 20, and the other end thereof is connected to the bellows driving carriage 30. As described above, the relative difference between the movements of the slider 16 and the bellows driving carriage 30 is not strictly zero, and high-accuracy movement of the slider 16, which directly contributes to the length measurement, is required to permit high-accuracy length measurement. At this time, the extension and contraction of the auxiliary bellows 38 which permits flexible coupling is able to absorb the error in the relative movement of the bellows driving carriage 30 and the slider 16 which serves as a disturbance.

The auxiliary bellows 40 is a double-structure bellows which is composed of an inner shell 40a and an outer shell 40b in the same way as the auxiliary bellows 38, and its inner side (or an inside of the inner shell 40a) is exhausted of the air by the vacuum pump into a vacuum state, while its outer side (or a space between the inner shell 40a and the outer shell 40b) is maintained at a predetermined pressure higher than the atmospheric pressure. One end of the auxiliary bellows 40 is connected to the interferometer portion 14, and the other end thereof is connected to the fixed portion 34. Since the interferometer portion 14 and the fixed portion 34 are both fixed to the body base 10 and do not move, although the auxiliary bellows 40 is stretchable in the directions of arrows in the drawing, the auxiliary bellows 40 does not extend or contract in the directions of the arrows.

Then, as for the portions of the bellows driving carriage 30 and the fixed portion 34 where the main bellows 36 and the auxiliary bellows 38 and 40 are connected, their interiors are hollow and are exhausted of the air by the vacuum pump into a vacuum state together with the main bellows 36 and the like. Accordingly, the laser light emitted from the laser light source 12 consecutively passes through the interferometer portion 14, the auxiliary bellows 40, the fixed portion 34, the main bellows 36, the bellows driving carriage 30, and the auxiliary bellows 38, and reaches the reflecting mirror 20. After being reflected by the reflecting mirror 20, the laser light consecutively passes through the auxiliary bellows 38, the bellows driving carriage 30, the main bellows 36, the fixed portion 34, and the auxiliary bellows 40, and is made incident upon the interferometer portion 14. In the configuration of this embodiment as well, the vacuum space between the interferometer portion 14 and the reflecting mirror 20 constitutes the length-measuring optical path, and is not affected by the change of the refractive index due to changes in the air temperature or pressure, humidity, and $CO_2$ concentration, thereby making possible high-accuracy length measurement.

In addition, since the auxiliary bellows 39 connected to the reflecting mirror 20 practically does not extend or contract in the directions of the arrows in the drawing due to the bellows driving carriage 30 which moves together with the slider 16 as described above, the spring force accompanying the extension or contraction of the bellows exerts substantially no effect upon the reflecting mirror 20, so that it is possible to prevent a decline in the length-measuring accuracy. It should be noted that even in a case where the slider 16 and the bellows driving carriage 30 do not move accurately by the same amounts in the same direction, since the auxiliary bellows 38 is stretchable in the directions of the arrows in the drawing as described above, the auxiliary bellows 38 is capable of absorbing the change, and practically does not affect the reflecting mirror 20. It goes without saying that since the auxiliary bellows 38 has the double structure, the auxiliary bellows 38 is capable of absorbing a suction force ascribable to the pressure difference between the vacuum state and the atmospheric pressure.

Furthermore, the auxiliary bellows 40 disposed between the interferometer portion 14 and the fixed portion 34 does not extend or contract in the directions of the arrows since the interferometer portion 14 and the fixed portion 34 are both fixed to the body base 10 as described above. Accordingly, the spring force accompanying the extension or contraction of the auxiliary bellows 40 does not affect the interferometer portion 14, and a decline in the accuracy does not occur. In addition, since the auxiliary bellows 40 has the double structure in the same way as the auxiliary bellows 38, the auxiliary bellows 40 is capable of offsetting a suction force ascribable to the difference between the internal vacuum state and the atmospheric pressure. In this aspect as well, the strain imparted to the interferometer portion 14 can be eliminated, and high-accuracy length measurement becomes possible.

As described above, in this embodiment, the extension and contraction of the auxiliary bellows 38 connected to the reflecting mirror 20 is prevented by the bellows driving carriage 30. At the same time, since the double structure is adopted, the effect of the force ascribable to the pressure difference is prevented to eliminate the strain in the reflecting mirror 20. Additionally, the extension and contraction of the auxiliary bellows 40 connected to the interferometer portion 14 is prevented by the fixed portion 34. At the same time, since the double structure is adopted, the effect of the force ascribable to the pressure difference is prevented to eliminate the strain in the interferometer portion 14. Accordingly, the conventional problems can be overcome, and high-accuracy length measurement becomes possible.

<Second Embodiment>

Figure 2:
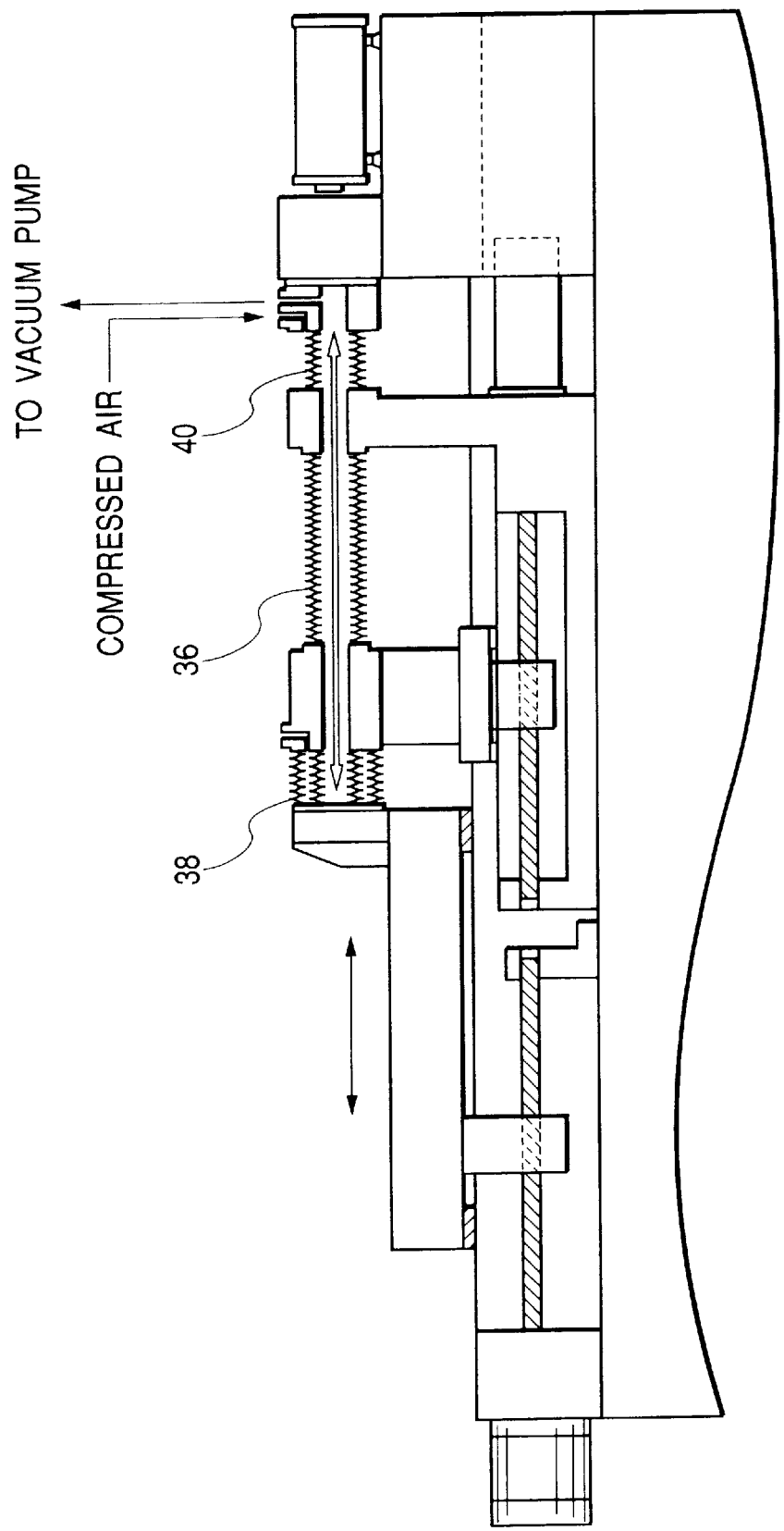
FIG. 2 is a schematic diagram of a laser interferometric measuring instrument of a second embodiment according to the present invention.

FIG. 2 shows the configuration of an optical interferometric measuring instrument in accordance with a second embodiment of the present invention. In the first embodiment shown in FIG. 1, the main bellows 36 serving as the main light guiding portion is a single-structure bellows, and the auxiliary bellows 38 serving as the first auxiliary light guiding portion and the auxiliary bellows 40 serving as the second auxiliary light guiding portion are bellows having the double structure. In this embodiment, the difference lies in that the auxiliary bellows 40 serving as the second auxiliary light guiding portion disposed between the interferometer portion 14 and the fixed portion 34 does not have the double structure, but has the single structure in the same way as the main bellows 36. By virtue of this arrangement as well, since the distance between the interferometer portion 14 and the fixed portion 34 is constant, there is no extension or contraction of the auxiliary bellows 40 as a consequence of the movement of the slider 16, so that it is possible to minimize the strain imparted to the interferometer portion 14. It should be noted that although the strain which is imparted to the interferometer portion 14 due to the suction force ascribable to the difference between the internal vacuum state and the atmospheric pressure since the auxiliary bellows 40 is provided with the single structure, the length measurement with higher accuracy than in the conventional art is possible by the portion in which there cease the strains imparted to the interferometer portion 14 and the reflecting mirror 20 by the spring force occurring as a consequence of the movement of the slider 16 in the conventional art as shown in FIG. 7 or 8. In addition, since the number of component parts of the double bellows is reduced as compared with the embodiment shown in FIG. 1, there is a merit in that this embodiment is advantageous in terms of cost and fabrication.

<Third Embodiment>

Figure 3:
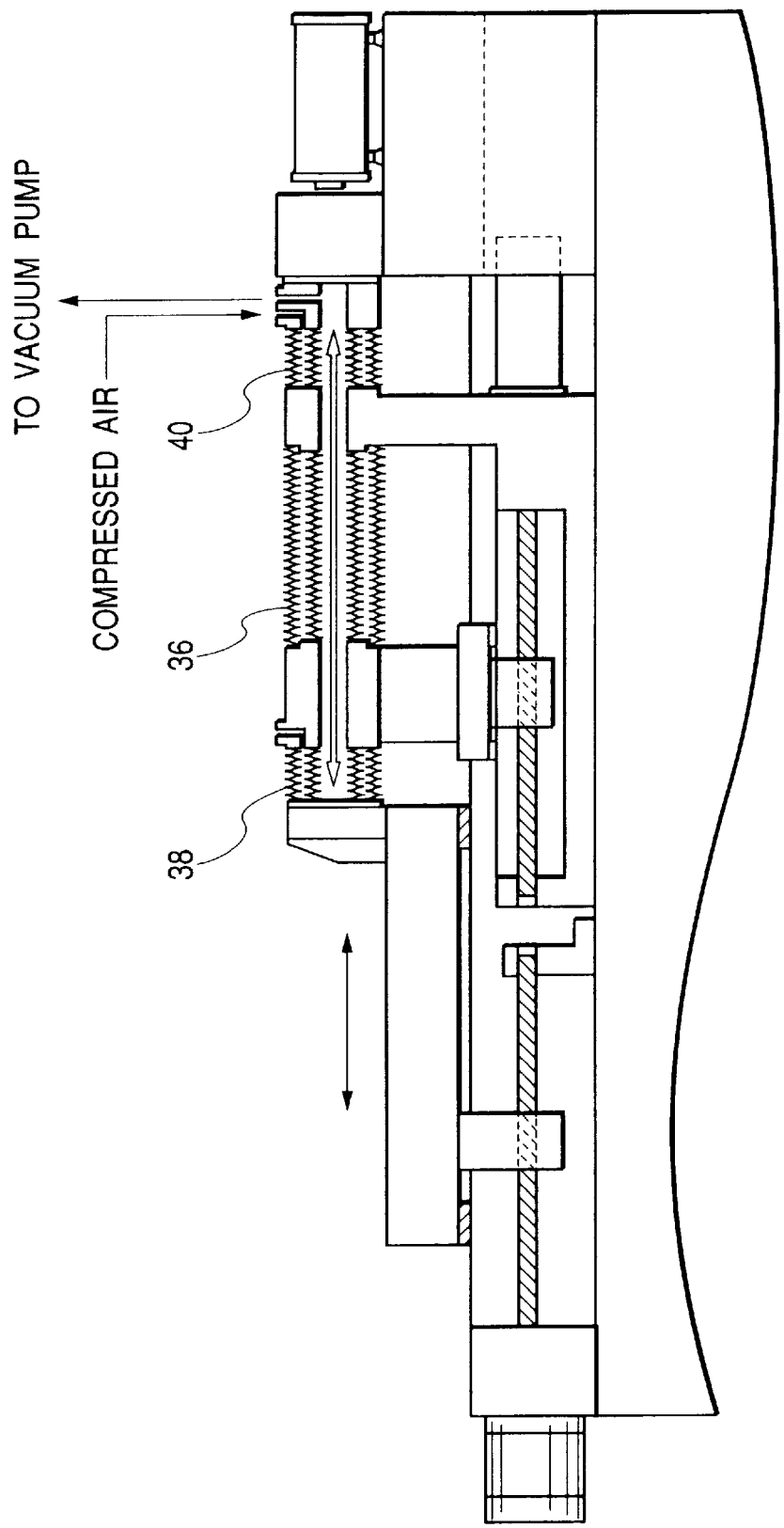
FIG. 3 is a schematic diagram of a laser interferometric measuring instrument of a third embodiment according to the present invention.

FIG. 3 shows the configuration of an optical interferometric measuring instrument in accordance with a third embodiment of the present invention. The difference with the first embodiment shown in FIG. 1 lies in that the main bellows 36 serving as the main light guiding portion is formed as a bellows having the double structure in the same way as the auxiliary bellows 38 and 40, i.e., all of the main light guiding portion, the first auxiliary light guiding portion, and the second auxiliary light guiding portion are provided with the double structure. Since the main bellows 36 is also provided with the double structure, this embodiment is disadvantageous in terms of cost or fabrication as compared with the first embodiment; however, there is an advantage in that the suction force ascribable to the difference between the internal vacuum state and the atmospheric pressure can be offset, so that even higher-accuracy length measurement becomes possible.

Although a description has been given above of the first, second and third embodiments of the invention, the invention is not limited to the same, and various embodiments in use are possible. For example, in the optical interferometric measuring instrumentes shown in FIGS. 1, 2, and 3, the auxiliary bellows 40 serving as the second auxiliary light guiding portion disposed between the interferometer portion 14 and the fixed portion 34 may be formed not as a bellows but as a hollow metallic cylinder whose interior is evacuated. Since the second auxiliary light guiding portion is connected between the interferometer portion 14 and the fixed portion 34, the second auxiliary light guiding portion need not necessarily be stretchable, and an arbitrary material may be used instead of a metal insofar as the material has strength of such a degree as to be capable of withstanding the suction force occurring due to the fact that its interior is evacuated. It goes without saying that if a double structure is provided to offset the force ascribable to the pressure difference, the range of the materials used will expand, and its shape may not be a hollow cylinder but may be arbitrary such as a prism or the like.

In the case where the accuracy of a line standard is evaluated by using such a laser interferometric measuring system, the evaluation is performed as follows. Namely, the line standard is mounted on a slider portion, and scale marks of the line standard are detected by a photoelectron microscope or the like. Then, it is possible to evaluate the accuracy of the line standard by calculating the deviation of the interval between the scale marks detected by the photoelectron microscope by using as a reference the amount of displacement of the slider detected by using a laser interferometric measuring instrument.

As such an apparatus for evaluating the line standard, the high-accuracy detection of the amount of displacement of the slider, which serves as the reference, by the laser interferometric measuring instrument naturally becomes a prerequisite. In the case where the above-mentioned laser interferometric measuring instrument of the present invention is used as the apparatus for evaluating the line standard it is possible to evaluate the accuracy of the line standard more precisely.

<Fourth Embodiment>

Meanwhile, FIGS. 4A–C shows an example of the configurations of a laser interference apparatus for evaluating a line standard according to a forth embodiment of the present invention. As a basic configuration, the arrangement provided is such that, in the laser interference apparatus shown in FIG. 1, a line standard serving as an object to be evaluated is further provided on the slider 16, and a photoelectron microscope for detecting the scale of this line standard is provided. In the drawings, FIG. 4A is a plan view, FIG. 4B is a side elevational view, and FIG. 4C is a front elevational view. The laser interferometric measuring instrument is mounted on the body base 1, and a line standard 5 serving as the object to be evaluated is fixed on the slider 16 along the direction of the movement of the slider 16. The center axis of the scale of the line standard 5 is disposed on the optical axis of the laser interference apparatus, i.e., on the optical axis of a variable-length optical path 22 which is formed between the interferometer portion 14 and the reflecting mirror 20. In addition, an arm 1a is provided on the body base 1, and a photoelectron microscope 4 for detecting the scale of the line standard 5 is disposed at the distal end of the arm 1a. A center 6 of detection of the scale of the line standard 5 by the photoelectron microscope 4 is on the optical axis of the variable-length optical path 22.

In such a configuration, the amount of displacement of the slider 16 is detected with high-accuracy by the interference due to an optical path difference between the variable-length optical path 22 and a reference optical path formed by the laser light source 12 and a fixed mirror 21. In addition, the interval between the scale marks of the line standard 5 is detected by the photoelectron microscope 4. Then, the accuracy of the line standard 5 is evaluated on the basis of the deviation between the two detected values.

It should be noted that if the body base 1 is arranged to be bilaterally symmetric about a vertical plane including the optical axis of laser interference (axis of the variable-length optical path), and is designed such that the movement of the center of gravity of the slider is located within the vertical plane including the optical axis of laser interference, the body base 1 is able to minimize the occurrence of torsion due to the movement of the center of gravity of the slider 16 and torsion due to the asymmetry of heat.

In addition, although in this embodiment a case has been shown in which the slider 16 is provided with the line standard 5, i.e., the object to be processed, and the photoelectron microscope is provided as the processing means to effect processing for evaluating the accuracy of the line standard, the invention is not limited to the same, and is applicable to other processing as well. For instance, by providing a probe, a machining head, or an exposure head as the processing means instead of the photoelectron microscope 4, and by effecting end-standard evaluation processing, machining, and exposure processing, respectively, it is possible to construct an end-standard evaluation processing apparatus for such as a gage block or a step gage, an ultra precision machining apparatus, a high-precision exposure apparatus, and the like. If the ultra precision machining apparatus is cited as an example, a workpiece is provided on the slider 16, and machining is effected by the machining head while high-precision positioning is being done by the laser interferometric measuring instrument, permitting high-precision machining.

<Fifth Embodiment>

FIGS. 5A–C respectively show the configurations of a laser interference apparatus for evaluating a line standard in accordance with a fifth embodiment of the present invention. In the drawing, FIG. 5A is a plan view, FIG. 5B is a side elevational view, and FIG. 5C is a front elevational view. The major difference with the configuration shown in FIG. 4 lies in the configuration of the reference optical path. Namely, in the configuration in FIG. 4, the laser light emitted from a laser light source 12 is split by a half prism inside an interferometer portion 14, is reflected by a fixed mirror 21 in the interferometer portion 14, and is returned again to the half prism, thereby forming the reference optical path. In this embodiment, however, a reference optical path 24 is present in such a manner as to extend in parallel with the moving direction of a slider 16 in the same way as a variable-length optical path 22. The fixed reflecting mirror 21a constituting an end portion of the reference optical path 26 is not present perpendicularly to the variable-length optical path 22 inside the interferometer portion 14 as in FIG. 4, but is disposed on a straight line connecting a photoelectron microscope 4 and the center 6 of detection in parallel with the variable-length optical path 22 along the moving direction of the slider 16. A line standard 5 is provided on the slider 16, and the photoelectron microscope 4 and the fixed reflecting mirror 21a are fixed to a bridge structure 3 which is disposed in such a manner as to straddle the slider 16 and the variable-length optical path 22 as shown in FIG. 5B. The bridge structure 3 has its legs fixed to a body base 1.

The laser light emitted from the laser light source 12 is split by a half prism inside the interferometer portion 14, and one split portion travels along the variable-length optical path 24, is reflected by a reflecting mirror 20 provided on the slider 16, and returns to the interferometer portion 14. The variable-length optical path 22 is made up by a bellows 27 and a double bellows 28 whose interiors are set in a vacuum state. The other portion split by the half mirror is reflected by a mirror 14a inside the interferometer portion 14, and is converted to light parallel with the variable-length optical path 22. The reference optical path 24 between the interferometer portion 14 and the fixed reflecting mirror 21a provided on the bridge structure 3 includes a pipe-like structure 26 and the and the double bellows 28 whose interiors are maintained in a vacuum state, and the structure provided is such that the pipe-like structure 26, the bridge structure 3, and the interferometer portion 14 are connected flexibly by the double bellows 28 so as not to apply an external force to both.

Thus, in this embodiment, since the fixed reflecting mirror 21a which forms the end portion of the reference optical path is disposed at the same position as the center 6 of detection by the photoelectron microscope 4 in the direction of the moving axis of the slider 16, even if deflection occurs in the body base 1 due to the thermal deformation of the body base caused by the variation of the ambient temperature and the movement of the slider 16, and the center 6 of detection by the photoelectron microscope 4 is consequently deflected in the direction of laser interferometric measurement, the fixed reflecting mirror 21 which forms the reference optical path is also simultaneously displaced equally in the direction of the laser interferometric measurement owing to this deflection in the same way as the center 6 of detection by the photoelectron microscope 4, thereby offsetting the detection error due to the photoelectron microscope and the detection error of the laser interferometric measuring instrument serving as a reference. Namely, the reference optical path is displaced in synchronism with the center of detection by the photoelectron microscope owing to the deflection of the body base, whereby the detection error of the photoelectron microscope is automatically corrected. Accordingly, the deflection of the body base 1 does not affect the evaluation of the line standard, so that more high-accuracy evaluation becomes possible.

FIG. 6 schematically shows the deflection of the body base 1 caused by the movement of the weight load with respect to the body base 1 as a consequence of the movement of the slider 16. In the drawing, when the slider 16 moves from the position indicated by the solid lines to the position indicated by the two-dotted dash lines, the surface of the body base 1 is deflected downward in the drawing due to the weight of the slider 16. If it is assumed that the angle of deflection of the surface of the body base 1 is θ, that the height of the center 6 of detection by the photoelectron microscope 4 from a guide surface (a rail surface in a case where the slider 16 is mounted on rails) of the body base 1 is h, and that the amount of movement of the center 6 of detection by the photoelectron microscope in the length-measuring direction due to the deflection is ε, we have $$\epsilon = h \cdot \sin\theta \qquad \ldots (1)$$

and this amount of movement ε constitutes the error in the evaluation of the accuracy of the line standard 5.

According to the laser interference apparatus of the fifth embodiment of the present invention, similar to in the laser interference apparatus shown in FIGS. 4A–C, since the optical path of the laser is at a vacuum, it is possible to avoid the variation of the laser wavelength ascribable to the variation of the refractive index and the like of air. Further, it is possible to reduce deflection occurred in the body base 1 due to the effect of the extension and contraction of the body base 1 caused by thermal deformation in the direction of the laser interferometric measurement in the variable-length optical path 22 ascribable to the variation of the ambient temperature of surrounding, and due to the movement of the weight load with respect to the body base 1 as a consequence of the movement of the slider 16, thereby preventing the center 6 of detection by the photoelectron microscope 4 from moving in the direction of the laser interferometric measurement.

In addition, it is, of course, theoretically possible to overcome the amount of movement ε(the error) by measuring this error e by using another laser interferometric measuring instrument and by effecting correction with respect to the amount of movement of the line standard which moves integrally with the slider 16. However, the configuration of the evaluation system becomes unduly complicated, so that there is a problem in that the cost increases.

It should be noted that if the body base 1 is arranged to be bilaterally symmetric about a vertical plane including the optical axis of laser interference (axis of the variable-length optical path), and is designed such that the movement of the center of gravity of the slider is located within the vertical plane including the optical axis of laser interference, the body base 1 is able to minimize the occurrence of torsion due to the movement of the center of gravity of the slider 16 and torsion due to the asymmetry of heat. Hence, coupled with the arrangement of the reference optical path, it is possible to eliminate the error reliably.

In addition, although in this embodiment a case has been shown in which the slider 16 is provided with the line standard 5, i.e., the object to be processed, and the photoelectron microscope is provided as the processing means to effect processing for evaluating the accuracy of the line standard, the invention is not limited to the same, and is applicable to other processing as well. For instance, by providing a probe, a machining head, or an exposure head as the processing means instead of the photoelectron microscope 4 provided on the bridge structure 3, and by effecting end-standard evaluation processing, machining, and exposure processing, respectively, it is possible to construct an end-standard evaluation processing apparatus for such as a gage block or a step gage, an ultraprecision machining apparatus, a high-precision exposure apparatus, and the like. If the ultraprecision machining apparatus is cited as an example, a workpiece is provided on the slider 16, and machining is effected by the machining head while more high-precision positioning is being done by the laser interferometric measuring instrument, permitting high-precision machining without being affected by the deflection of the body base 1. Further, the laser interference apparatus of the above-mentioned fourth or fifth embodiment can use not only the laser interferometric measuring instrument of the first embodiment, but also other laser interferometric measuring instruments.

As described above, in accordance with the optical interferometric measuring instrument of the invention, it is possible to avoid the variation of the laser wavelength ascribable to the change of the refractive index of air when the laser light passes through the air, and it is possible to reliably prevent the effect of the spring force based on the extension or contraction of the vacuum bellows and the like upon the light interference system and the reflecting optical system. Hence, length measurement with higher accuracy than in the conventional art is made possible.

As described above, in accordance with the laser interference apparatus of the present invention, it is possible to simply eliminate an error due to the thermal deformation of the body base caused by the variation of the ambient temperature and due to the deflection of the body base as a consequence of the movement of the slider, thereby permitting high-accuracy processing using a laser interferometric measuring instrument. Further, it is possible to measure with more high-accuracy by using the above-mentioned laser interferometric measuring instrument of the present invention, thereby permitting more high-accuracy processing.

What is claimed is:

1. A laser interference apparatus comprising:

a body base;

a slider disposed movably on said body base and fixing thereon an object to be processed;

a laser interferometer having an interferometer portion for forming a variable length optical path of laser light extending on said body base in a moving direction of said slider and a fixed reflecting mirror for forming a reference optical path of the laser light extending on said body base in the moving direction of said slider, so as to measure an amount of movement of said slider by using interference of the laser light between said reference optical path and said variable-length optical path; and means for processing the object using as a reference the amount of movement of said slider which is identified by said laser interferometer, and a processing point that is disposed on an extension of an optical axis of said laser interferometer, wherein said means for processing is fixed on said body base, and said fixed reflecting mirror is fixed on said body base so as to be located at a same position as the processing point in the moving direction of said slider.

2. The laser interference apparatus according to claim 1, wherein said interferometer portion, said reference optical path, and said variable-length optical path are substantially in a vacuum state.

3. The laser interference apparatus according to claim 2, wherein said reference optical path is covered with a pipe-like structure and a bellows, said pipe structure being connected to said fixed reflecting mirror through said bellows.

4. The laser interference apparatus according to claim 3, wherein said bellows has a double structure formed by an inner shell and an outer shell covering said inner shell, an interior of said inner shell is substantially in a vacuum state, and a space formed by said outer shell and said inner shell has a predetermined pressure higher than the atmospheric pressure.

5. The laser interference apparatus according to claim 1, further comprising: a bridge structure fixed to said body base, said processing means and said fixed reflecting mirror being fixed on said bridge structure.

6. The laser interference apparatus according to claim 1, wherein said object to be processed is a line standard having a scale and fixed in parallel to the moving direction of said slider, and said processing means has a detector for detecting the scale at the processing point.

7. The laser interference apparatus according to claim 1, further comprising:

a reflection portion for forming said variable-length optical path with respect to said interferometer portion;

a moving portion disposed in said variable-length optical path and adapted to move in the moving direction of said slider in interlocking relation to said slider;

a fixed portion disposed fixedly in said variable-length optical path;

a main light guiding portion disposed between said moving portion and said fixed portion and capable of freely extending and contracting in the moving direction of said slider;

a first auxiliary light guiding portion disposed between said reflecting portion and said moving portion and capable of freely extending and contracting in the moving direction of said slider; and a second auxiliary light guiding portion disposed between said fixed portion and said interferometer portion.

8. The laser interference apparatus according to claim 7, wherein an interior of said main light guiding portion, an interior of said first auxiliary light guiding portion, an interior of said second auxiliary light guiding portion, and said variable-length optical path are substantially in a vacuum state.

9. The laser interference apparatus according to claim 7, wherein said first auxiliary light guiding portion has a double structure formed by an inner shell and an outer shell covering said inner shell, an interior of said inner shell is substantially in a vacuum state, and a space formed by said outer shell and said inner shell has a predetermined pressure higher than the atmospheric pressure.

10. The laser interference apparatus according to claim 7, wherein each of said first auxiliary light guiding portion and said second auxiliary light guiding portion has a double structure formed by an inner shell and an outer shell covering said inner shell, an interior of said each inner shell is substantially in a vacuum state, and a space formed by said each outer shell and said corresponding inner shell has a predetermined pressure higher than the atmospheric pressure.

11. The laser interference apparatus according to claim 7, wherein each of said main light guiding portion, said first auxiliary light guiding portion, and said second auxiliary light guiding portion has a double structure formed by an inner shell and an outer shell covering said inner shell, an interior of said each inner shell is substantially in a vacuum state, and a space formed by said each outer shell and said corresponding inner shell has a predetermined pressure higher than the atmospheric pressure.

12. The laser interference apparatus according to claim 11, wherein said main light guiding portion, said first auxiliary light guiding portion, and said second auxiliary light guiding portion are formed by bellows.

13. The laser interference apparatus according to claim 7, wherein said second auxiliary light guiding portion is formed by a hollow metallic cylinder.

* * * * *